UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

VIOLET DYE.

SPECIFICATION forming part of Letters Patent No. 464,566, dated December 8, 1891.

Application filed November 22, 1890. Renewed November 6, 1891. Serial No. 411,034. (No specimens.)

*To all whom it may concern:*

Be it known that I, MEINHARD HOFFMANN, doctor of philosophy, a citizen of Prussia, and a resident of Mainkur, near Frankfort-on-the-Main, Germany, have invented certain new and useful Improvements in the Manufacture of a New Violet Azo Coloring-Matter, of which the following is a specification.

This invention relates to a new azo compound, which I name "naphthaline-violet," and which I produce by reacting with the tetrazo derivative of diamidonaphtaline beta-disulphonic acid upon alpha-naphthylamine. This diamido acid is not yet known. I therefore first describe in what manner it may be produced. I dissolve 32.6 kilograms naphthaline beta-disulphonate of lime (described by Ebert and Merz) with two hundred kilograms of sulphuric acid and add a cold mixture of twenty kilograms strong nitric acid and twenty kilograms of sulphuric acid. After a three days' standing the whole is poured into six hundred liters of water saturated with common salt. The dinitro compound is separated after cooling in form of yellow crystals. It is suspended in four hundred liters water and reduced by means of iron and some acetic acid. When the reduction is completed, the iron is precipitated by carbonate of soda. From the filtered solution the diamidonaphthaline beta-disulphonic acid is precipitated by addition of twenty kilograms muriatic acid in the form of a colorless crystalline powder.

In order to produce from this acid the new substance, which I name "naphthaline-violet," I proceed as follows: 36.2 kilograms of diamidonaphthaline beta-disulphonate of sodium are dissolved in four hundred liters water. To this solution I add sixty kilograms hydrochloric acid and fourteen kilograms nitrite of soda. The insoluble yellow tetrazo compound separates immediately. It is filtered and introduced into a solution of thirty-six kilograms of alpha-naphthylamine chlorhydrate in one thousand liters of water. Instead of this aqueous solution, I may use a solution of twenty-nine kilograms of alpha-naphthylamine in six hundred liters of alcohol. The formation of the coloring-matter can be accelerated by addition of a small quantity of carbonate or acetate of soda. The coloring-matter, which is difficultly soluble in cold water, is filtered off and dried. It dyes animal and vegetable fibers in neutral alkaline or acid bath a bright-violet shade.

The principal value of this coloring-matter consists in its property of transformation by nitrous acid into a tetrazo compound, which reacts upon phenols or amines forming fast colors.

This manufacture is the subject of another specification of this date.

What I claim as new, and desire to secure by Letters Patent, is—

The new substance or coloring-matter produced by the action of tetrazonaphthaline beta-disulphonic acid, herein described, upon alpha-naphthylamine having the constitution $C_{10}H_4(SO_3Na)_2 = [N=N-C_{10}H_6NH_2(a)]_2$, and showing the following characteristics: it dissolves in hot water easily with a violet color, in concentrated sulphuric acid with a blackish-blue color, and by reducing agents it is decomposed into diamidonaphthaline beta-disulphonic acid and naphthylinediamine.

In testimony that I claim the foregoing as my invention I have signed my name, in presence of two witnesses, this 11th day of November, 1890.

MEINHARD HOFFMANN.

Witnesses:
ALVESTO S. HOGUE,
JEAN GRUND.

It is hereby certified that in Letters Patent No. 464,566, granted December 8, 1891, upon the application of Meinhard Hoffman, of Mainkur, near Frankfort-on-the-Main, Germany, for an improvement in "Violet Dyes," an error appears in the printed specification requiring correction, as follows: In the heading the words "No specimens" should read *Specimens;* and that the Letters Patent should be read with this correction therein that the same may conform to the record of the case in the Patent Office.

Signed, countersigned, and sealed this 5th day of April, A. D. 1892.

[SEAL.]

CYRUS BUSSEY,
*Assistant Secretary of the Interior.*

Countersigned:
W. E. SIMONDS,
*Commissioner of Patents.*